United States Patent [19]

Precure

[11] Patent Number: 4,634,056

[45] Date of Patent: Jan. 6, 1987

[54] COMPOST DISTRIBUTOR

[76] Inventor: Carroll R. Precure, Rte. 1, Box 1005, Muleshoe, Tex. 79347

[21] Appl. No.: 690,753

[22] Filed: Jan. 11, 1985

[51] Int. Cl.[4] .......... A01C 15/18

[52] U.S. Cl. .......... 239/661; 239/672; 222/168; 180/292; 414/528

[58] Field of Search .......... 239/650, 661, 672; 222/168, 608, 609, 622, 626; 180/208, 242; 280/656; 298/9, 12; 414/523, 528

[56] References Cited

U.S. PATENT DOCUMENTS

| | | | |
|---|---|---|---|
| 2,996,206 | 8/1961 | McKee | 280/656 X |
| 3,134,607 | 5/1964 | Doll | 280/656 X |
| 3,516,576 | 6/1970 | Elliott | 222/622 |
| 4,557,346 | 12/1985 | Guignard et al. | 180/242 |
| 4,570,741 | 2/1986 | McCoy | 180/242 |

FOREIGN PATENT DOCUMENTS

| | | | |
|---|---|---|---|
| 69865 | 9/1949 | Denmark | 222/609 |
| 70956 | 5/1950 | Denmark | 222/609 |
| 303607 | 1/1929 | United Kingdom | 239/650 |

*Primary Examiner*—Joseph F. Peters, Jr.
*Assistant Examiner*—Scott Malpede
*Attorney, Agent, or Firm*—Wendell Coffee

[57] ABSTRACT

A compost spreader has a hopper mounted on a turntable so that the hopper may be rotated lengthwise to go through gates but crosswise when spreading the compost. The frame of the spreader telescopes so as to accommodate the length of the hopper when the hopper is turned lengthwise. After the spreader has gone through the gate and the hopper turned crosswise, then the frame is shortened or collapsed. The compost is distributed from the hopper by an endless belt at the bottom of the hopper.

6 Claims, 8 Drawing Figures

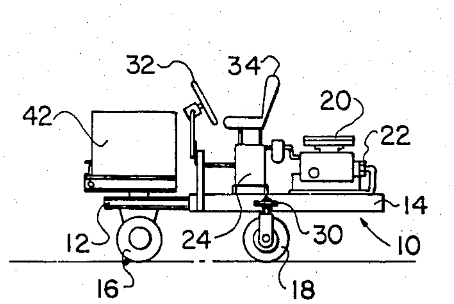
FIG-4
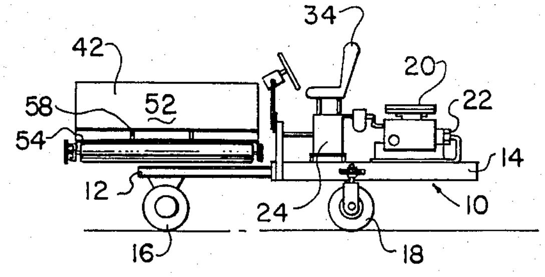
FIG-3
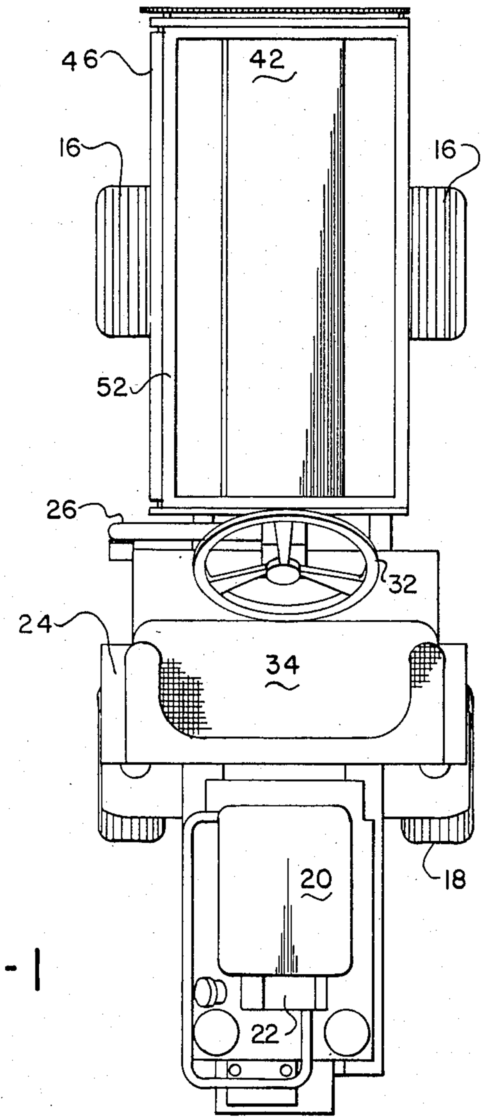
FIG-1
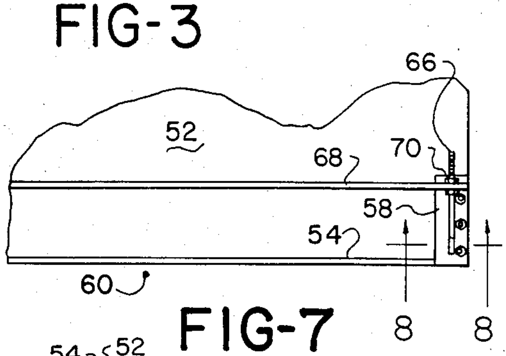
FIG-7
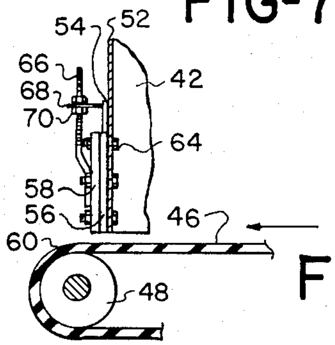
FIG-6
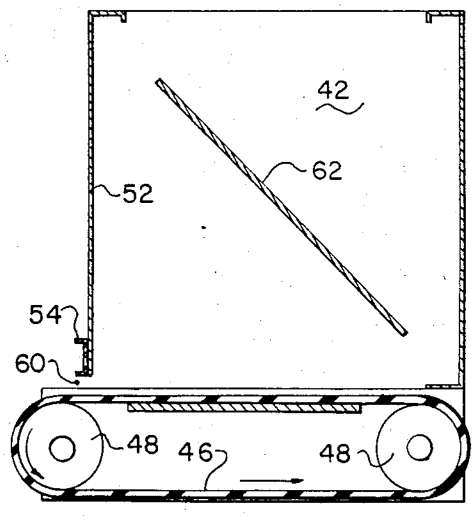
FIG-5
FIG-8
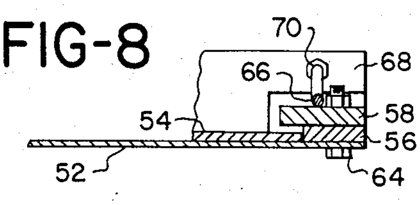

COMPOST DISTRIBUTOR

BACKGROUND OF THE INVENTION

1. Field of the Invention

This invention relates to distributing compost on household lawn or gardens. One having ordinary skill in this art is a person who distributes compost, manure, or other fertilizers. More particularly, this invention relates to dispensing from a movably mounted supply container, rotatable about a vertical axis; or dispensing from a land vehicle; or material handling from a self-unloading land vehicle.

2. Description of the Prior Art

It will be understood that for a long time that compost, manure, or other forms of fertilizer have been applied by householders upon their gardens or lawns. Also, in many cases, the people have lawns or gardens in a fenced area, e.g., a back yard. In such cases, it is necessary for the material to be moved through gates having a width of about 37" for the material to be applied to the plot of a lawn or garden.

Before this invention, most compost was distributed by a shovel. I.e., the compost would be scooped by a shovel from a truck bed onto the plot for which it was intended. Sometimes the compost was moved from the truck to a wheel barrow and the wheel barrow moved adjacent to the plot to which the compost was applied. In other situations, the compost was dumped from the truck onto the ground and then distributed by a shovel, with or without the help of a wheel barrow, onto to plot desired.

Of course, in agricultural usage, manure or other fertilizers are generally distributed by trucks having a distributor at the rear of the truck. In these instances, either a whirlwind type distributor is used, but in any case, normally, the distributor throws the material over a considerable distance for uniformity of application. However, when compost is to be applied around a residence, normally it is not desirable to throw the compost by a mechanical device, inasmuch as the compost would be thrown against fences or walls.

Before this application was filed, the applicant caused a search to be made in the U.S. Patent and Trademark Office. The following patents were found in 414/467 on that search: U.S. Pat. No. 2,325,445 to Wagoner and Great Britain Pat. No. 4045042A (10/29/80).

These patents are considered pertinent because the applicant believes the Examiner would consider anything revealed by an experienced patent searcher to be relevant and pertinent to the examination of this application.

SUMMARY OF THE INVENTION

1. New Functions and Surprising Results

I have invented a compost distributor particularly adapted for mechanically distributing compost within fenced yards.

The compost is loaded into a hopper upon a wheeled distributor. The distributor is powered by an internal combustion engine which drives a hydraulic pump. The pump drives the ground engaging wheels of the vehicle as well as provides the power for spreading the compost and other mechanical functions. The hopper is wider than the wheel width so the compost may be distributed quickly over a wide area. The wheel width is 36". With the hoppor turned lengthwise, the overall width of the vehicle is less than the width of most of the yard gates. Therefore, the hopper is mounted on a turntable so that it may be turned lengthwise or crosswise.

When the spreader is in use and spreading compost, it is desired that it have a very short turning radius, and it is also desired that the operator can be seated upon the vehicle with full access and view of the hopper to make certain that the hopper does not run empty. It is also desired that the operator have full view of trees, walls, fences, walkways, and the like so that the vehicle does not bump against trees fences or walls nor is the compost unnecessarily distributed on walkways. In use, it is desirable that the wheel base of the vehicle be as short as possible and the driver's seat be immediately behind the hopper.

However, these conditions are not compatible with having the hopper rotated on the turntable to have the length of the hopper extend along where the operator would otherwise be located. I have solved this problem by having the frame of the vehicle telescoped so that the wheel base of the vehicle is greatly expanded so that the hopper may be rotated lengthwise of the vehicle. The wheel base then contracted when the hopper is crosswise or in the normal spreading position.

To distribute the compost evenly, I use an endless belt at the bottom of the hopper. It is trained over a pair of rollers. The rate of distribution is governed by the rate of rotation of the rollers and also by the gap between the side or front side of the hopper and the belt. Obviously there is an adjustable lip so that the size of this gap may be adjusted. Also, of course, the character of the compost dictates the minimum width of the gap.

However, with such a distribution system of this nature, evenly distributes the compost but does not throw it over walkways or up against walls and fences. Thus it may be seen that I have a novel combination of elements to solve the problem of spreading compost in small restricted plots.

2. Objects of this Invention

An object of this invention is to spread compost in small, enclosed, restricted plots.

Further objects are to achieve the above with devices that are sturdy, compact, durable, lightweight, simple, safe, efficient, versatile, ecologically compatible, energy conserving, and reliable, yet inexpensive and easy to manufacture, fill, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a top plan view of a compost distributor according to this invention.

FIG. 3 is a side elevational view of the distributor, in the extended position.

FIG. 4 is a side elevational view of the distributor, in the position to distribute compost from the hopper.

FIG. 5 is a sectional view of the hopper of the distributor.

FIG. 6 is a front elevational detail of the hopper.

FIG. 7 is a sectional view of the hopper taken substantially on line 77 of FIG. 6.

FIG. 8 is a sectional view of the hopper taken substantially on line 88 of FIG. 6.

DESCRIPTION OF THE PREFERRED EMBODIMENT

Figure 2:
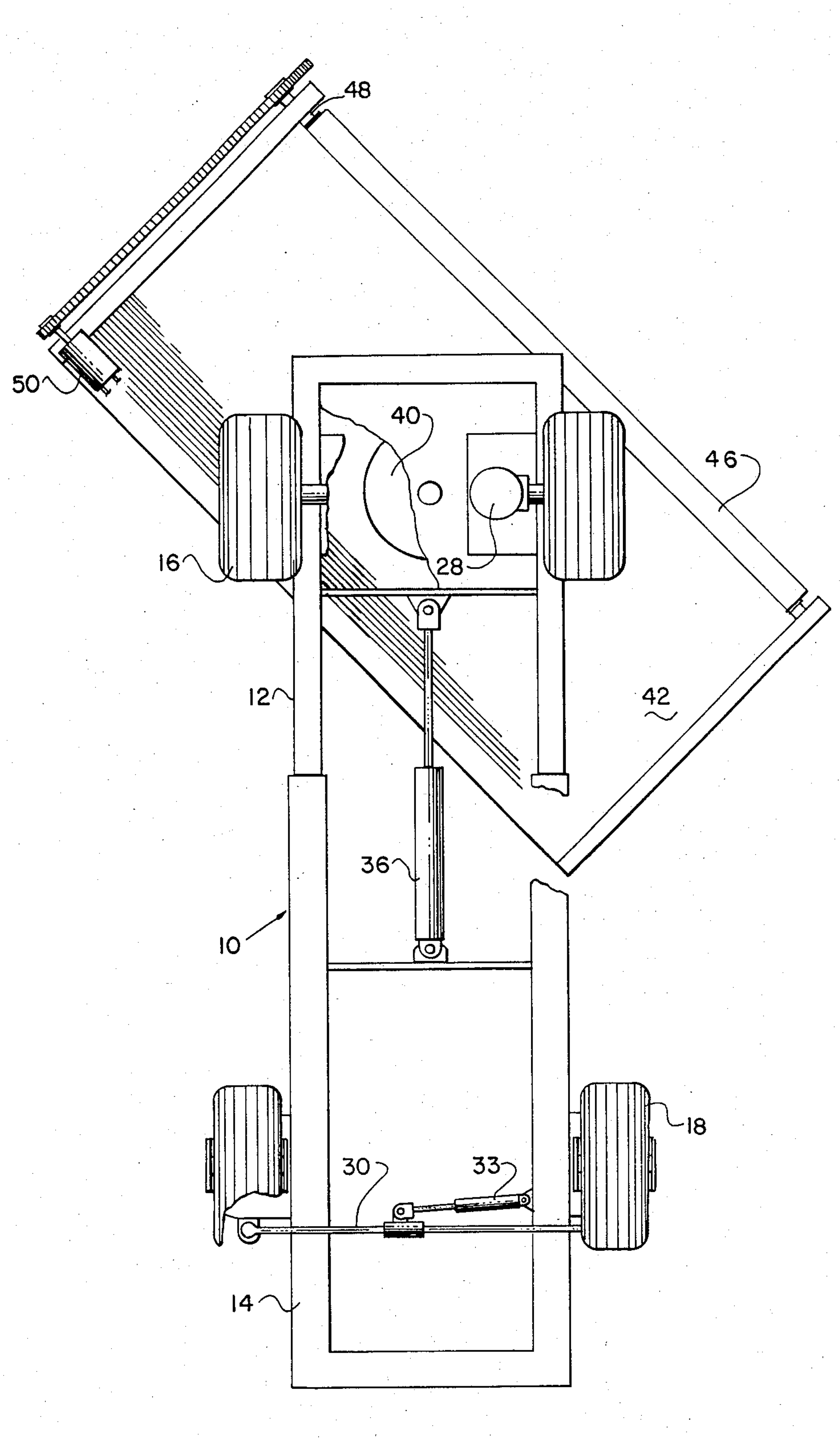
FIG. 2 is a bottom plan view of the compost distributor with parts broken away for clarity.

Referring to the drawings, it may be seen represented, a compost or other spreadable material distributor having frame 10. The frame has hopper end 12 which would normally be the forward end of the frame and driver end 14 which would normally be at the back end of the frame. Hopper wheels 16 are journalled to the frame beneath the hopper end. These wheels are located on either side of the axis of frame 10. The axis of the frame extends in a straight line from the hopper end through the driver end and being at the median of the frame. Hopper wheels 16 will have a certain wheel width. The wheel width at the hopper wheels will be the widest part of the compost distributor in certain operating conditions.

Driver wheels 18 are located upon the driver end 14 of the frame 10. These wheels are dirigible. Although the embodiment is shown with two driver wheels, those with ordinary skill in the art will understand that it is possible that distributors could be constructed with only a single drive wheel, making the vehicle a tricycle rather than having the four ground engaging wheels.

Engine 20 is mounted on the driver end 14 of the frame 10. I prefer to use an internal combustion engine as motive power for locomotion of the compost distributor and also to spread the compost from the distributor. In addition, I prefer to use it to provide power to steer the dirigible driver wheels 18.

Hydraulic pump 22 is mechanically connected to the engine 20 so that it is driven from the engine. The pump 22 is connected to hydraulic reservoir 24 and through valve manifold 26 to the wheel motors 28. The term valve manifold is used as though all of the valves were in a single location. However, it will be understood by those skilled in the art that the valve leading to the wheel motors 28 could be in the form of a foot peddle so that the speed of the compost distributor, either in the forward or reverse direction, could be controlled by the foot.

The wheel motors 28 are conveniently directly connected to the ground engaging wheels 16. However, those with ordinary skill in the art will understand that the drive wheels 18 could also be driven. The driver wheels are turned by steering assembly 30. I prefer to use a hydraulic steering assembly, i.e., having a hydraulic valve controlled by steering wheel 32. The driver wheels 18 turn to the right or to the left by suitable hydraulic cylinder 33. Although it is preferred that hydraulic steering be used, obviously those with ordinary skill in the art understand that this could be a mechanical steering as is well known.

The operator or the driver of the unit would be seated in the driver seat 34 located on the driver end 14 of the frame 10. The driver would be near the hopper as will be explained later.

The hopper end 12 and the driver end 14 of the frame are telescoped together. I.e., the distance from the hopper wheels 16 to the driver wheels may be adjusted by either extending the frame 10 or by retracting the frame 10. This is powered by telescope cylinder 36 which is controlled by hydraulic valve on the valve manifold 26. Thus it may be seen that the frame members are linear and some of the linear frame members which are parallel to the frame axis are smaller than others so that they telescope within the larger frame members. Whether the frame is extended so that the hopper wheels 16 are further away from the driver wheels 18 or retracted and closer together is controlled by the appropriate valve on valve manifold 26.

Turntable 40 is mounted upon the hopper end 12 substantially above the hopper wheels 16. The hopper 42 is mounted upon the turn table 40 so that it may be rotated about a vertical axis. The hopper has a length much greater than its width. The hopper 42 has a length which is greater than the wheel width. The hopper has a width which is less than the wheel width.

Since the hopper is upon the turn table 40, it can be turned crosswise of the frame which is to say that its length is normal to the frame axis. In such case, each end of the hopper will extend beyond the hopper wheels, and this position is the position to spread compost. Also, when the compost is being spread, the frame 10 will be retracted and the driver seat 34 will be very close to the hopper so that the driver has a good view of the contents of the hopper and also where the compost is being distributed. Also, with the frame retracted, the driver wheels 18 are closer to the hopper wheels 16 so that the vehicle as a whole has a short turning radius and is quite maneuverable in the enclosed areas wherein the compost is spread.

When the hopper 42 is turned so that the length of the hopper 42 is along the frame axis, the width of the hopper will be less than the frame axis width; and therefore, the vehicle can be driven through gates. Obviously, if the vehicle is made to go through a standard 36" gate, the wheel widths would be less than 36" and the hopper width would be less than the wheel widths so that the vehicle could be moved through the gate.

Since the length of the hopper is much greater than the hopper width when the hopper is rotated with the length along the frame axis, it is necessary that the turntable be extended away from the driver end and later retracted. As described above, one way is by having the frame extended or stretched out. One of the reasons for this is so that the steering wheel and the driver's seat does not interfere with the hopper in this position. But with the frame stretched out, the vehicle does not have as great a maneuverability or as short of a turning radius. However, in this position, the vehicle does not require or need as great of maneuverability.

The turning of the turntable 40 with the hopper 42 thereon is done manually.

Spreader belt 46 is in the bottom of the hopper 42. The spreader belt is trained around rollers 48, one at the front side 52 of the hopper, and the other at the opposite or back side. Spreader motor 50 is attached to the hopper in driving relationship to the roller 48 at the front side 52 of the hopper.

Lip 54 is adjustably attached to the bottom edge of front side 52 above the roller 48 at the front side. Therefore, gap 60 between the lip 54 and the roller 48 and belt 46, at this point, is adjustable. The lip 54 slides in grooves on each side of the front 52 of the hopper 42. The groove is found by a spacer 56 which is sandwiched between flange 58 and the front 52. The spacer and flange are held in place by bolts 64 as seen. The exact position of the lip 54; and therefore, the exact opening or gap 60 is determined by threaded rod 66 which is welded to the flange 58 and extends upward through lip flange 68. Nuts 70 are threaded onto the rods 66 on either side of the lip flange 68. All is seen in FIGS. 6, 7, and 8. Therefore, it may be seen that the exact position of the lip and width of the gap 60 is readily adjustable.

The amount of spreadable material in the hopper applied can be regulated by the speed of the spreader belt 46. The size of the gap 60 is governed more by the characteristics of the compost. I.e., if there are lumps in the compost, the gap must be larger than the average lump size.

Baffle 62 in the hopper 42 reduces the weight of the compost on the belt 36.

The embodiment shown and described above is only exemplary. I do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific examples above do not point out what an infringement of this patent would be, but are to enable one skilled in the art to make and use the invention.

As an aid to correlating the terms of the claims to the exemplary drawing, the following catalog of elements is provided:

10—Frame
12—Hopper End
14—Driver End
16—Hopper Wheels
18—Driver Wheels
20—Engine
22—Pump
24—Reservoir
26—Valve Manifold
28—Wheel Motor
30—Steering
32—Steering Wheel
33—Steering Cylinder
34—Driver Seat
36—Telescope Cylinder
40—Turntable
42—Hopper
46—Spreader Belt
48—Rollers
50—Spreader Motor
52—Front Side
54—Lip
56—Spacer
58—Flange
60—Gap
62—Baffle
64—Bolts
66—Rod
68—Lip Flange
70—Nuts Subject Matter Claimed for Protection

I claim as my invention:

1. In a spreadable material distributor having:

a. a frame, having
(i) a frame axis,
(ii) A hopper end, and
(iii) a driver end,
b. ground engaging wheels journaled to the frame, said wheels spaced on either side of the frame axis, and having a wheel width,
c. at least two of the wheels at the hopper end and at least one of the wheels at the driver end,
d. an engine on the frame,
e. a hopper on the frame at the hopper end having
(i) a bottom,
(ii) a hopper length greater than the wheel width, and
(iii) a hopper width less than the wheel width, and
f. spreader means on the hopper for distributing material from the hopper;

wherein the improved structure comprises:

g. a turntable on the frame,
h. the hopper on the turntable so that
(i) the hopper may be turned with the length along the frame axis to go through gates and the like, and
(ii) the hopper may be turned with the length normal to the frame axis to spread the material in the hopper,
j. a hydraulic reservoir on the frame
k. a hydraulic motor rotatably connected to said wheels at the hopper end,
l. a hydraulic pump mechanically connected to the engine and hydraulically connected to the reservoir and motor,
m. the frame telescoped between the hopper end and driver end, so that
(i) the frame may be stretched out when the hopper is aligned with the frame axis, and
(ii) the frame may be retracted when the hopper is normal to the frame axis.

2. The invention as defined in claim 1 with the addition of:

n. a telescoped hydraulic cylinder hydraulically connected to the pump and mechanically connected to the frame for stretching out and retracting the frame, and
o. a steering hydraulic cylinder hydraulically connected to the pump and mechanically connected to said wheel at the drive end for steering said wheel.

3. The invention as defined in claim 1 wherein the spreader means includes:

n. an endless belt at the bottom of the hopper trained over
o. rollers journaled to the hopper extending the length of the hopper,
p. a hydraulic spreader motor hydraulically connected to the pump and reservoir and mechanically connected to hopper for rotating one of the rollers,
q. a front side on the hopper extending the length of the hopper,
r. an adjustable lip on a bottom of the front side spaced over the belt at one of the rollers thus forming a gap between the lip and belt so that
s. the gap may be adjusted, thus regulating the rate the material in the hopper is distributed.

4. The invention as defined in claim 3 with the addition of:

t. a telescoped hydraulic cylinder hydraulically connected to the pump and mechanically connected to the frame for stretching out and retracting the frame, and
u. a steering hydraulic cylinder hydraulically connected to the pump and mechanically connected to said wheel at the drive end for steering said wheel.

5. In a spreadable material distributor having:

a. a frame, having
(i) a frame axis,
(ii) a hopper end, and
(iii) a driver end,
b. ground engaging wheels journaled to the frame, said wheels spaced on either side of the frame axis, and having a wheel width, c. at least two of the wheels at the hopper end and at least one of the wheels at the driver end, d. an engine on the frame, e. a hopper on the frame at the hopper end having (i) a bottom, (ii) a hopper length greater than the wheel width, and (iii) a hopper width less than the wheel width, and f. spreader means on the hopper for distributing material from the hopper;

wherein the improved structure comprises:

g. a turntable on the frame, h. the hopper on the turntable so that (i) the hopper may be turned with the length along the frame axis to go through gates and the like, and (ii) the hopper may be turned with the length normal to the frame axis to spread the material in the hopper, j. a hydraulic reservoir on the frame k. a hydraulic spreader motor connected to said spreader means, l. a hydraulic pump mechanically connected to the engine and hydraulically connected to the reservoir and motor, and m. means on the frame (i) for extending the turntable away from the driver end when the hopper is aligned with the frame axis, and (ii) for extending the turntable toward the driver end when the hopper is normal to the frame axis.

6. The invention is defined in claim 5 wherein the spreader means includes:

n. an endless belt at the bottom of the hopper trained over o. rollers journaled to the hopper extending the length of the hopper, p. said hydraulic spreader motor mechanically connected to one of the rollers, q. a front side on the hopper extending the length of the hopper, r. an adjustable lip on a bottom of the front side spaced over the belt at one of the rollers thus forming a gap between the lip and belt so that s. the gap may be adjusted, thus regulating the rate the material in the hopper is distributed.

* * * * *